United States Patent Office 2,841,504
Patented July 1, 1958

2,841,504

SURFACE COATED CALCIUM CARBONATE PIGMENTS

Lawrence M. Liggett, Wyandotte, Mich., assignor to Wyandotte Chemicals Corporation, Wyandotte, Mich., a corporation of Michigan No Drawing. Application September 1, 1953
Serial No. 377,983

10 Claims. (Cl. 106—308)

This application is a continuation-in-part of application Serial No. 325,883, filed December 13, 1952, for "Surface-Coated Calcium Carbonate Pigment," which latter application is now abandoned.

This invention relates to novel surface-coated calcium carbonate pigments which have improved properties as rubber reinforcing pigments. More specifically, the invention relates to a calcium carbonate pigment whose surface is coated with both a higher amine selected from the group consisting of 10–18 carbon atom, primary n-alkylamines and rosin amines, and a second coating material selected from the group consisting of 10–20 carbon atom fatty acids, rosin acids, lower esters of rosin acids and alkali metal salts of rosin acids.

Calcium carbonate, particularly when in a finely divided state of the order of 0.1 micron or less, has many desirable properties which make it valuable as a reinforcing pigment in both natural and synthetic rubbers. In particular, the fine particle size calcium carbonate reinforces the rubber in which it is incorporated and gives rise to high tensile strengths in the rubber stocks. Because calcium carbonate is pure white in color, it is possible to prepare high tensile strength light colored rubber stocks, which is not possible with many reinforcing pigments such as carbon black. Yet another valuable property of calcium carbonate is that it develops good building tack in GR-S formulations.

In spite of the many desirable properties of calcium carbonate, it has certain serious shortcomings which limit its acceptance by the rubber industry. The ultra fine particle size calcium carbonate forms hard agglomerates which are extremely difficult to incorporate and disperse in the rubber matrix. When such a fine particle size calcium carbonate is incorporated into rubber on a two-roll differential speed rubber mill, the calcium carbonate pigment forms a hard cake on the back roll which must be loosened by scraping, and the resulting agglomerated particles disperse poorly in the rubber. The aforementioned difficulties can be partially overcome by master batching techniques, but these require longer processing cycles and limit the acceptance of calcium carbonate in the rubber industry. A further shortcoming of calcium carbonate is that the 300% and 500% modulus values are lower than desired in many applications. Yet another shortcoming is that while calcium carbonate loaded stocks have good tear resistance and tensile values in natural rubber, optimum values of these properties are obtained at widely different pigment loadings and it is not possible to obtain both optimum tear and tensile values in the same rubber stock. In addition, both the optimum tear and tensile values are obtained at pigment loadings outside of the preferred pigment loading range that is employed in the rubber arts. Whereas calcium carbonate can be used over a wide range of pigment loadings in both natural and the diene type synthetic rubbers, it can only be used in relatively low loadings in butyl type polymers, unless special detackifying agents are used. When high loadings, i. e. above 100 parts of pigment per 100 parts of rubber, of calcium carbonate are employed in butyl rubber, the resulting stocks are so sticky that they cannot be processed on conventional rubber equipment. Obviously this characteristic limits the utility of calcium carbonate as a pigment in this type of polymer.

As set forth in the copending application of Alfred Korejwa et al., Serial No. 363,916, filed June 24, 1953, now U. S. Patent, No. 2,709,160, many of the aforementioned shortcomings of calcium carbonate can be overcome by coating the surface of the calcium carbonate with a higher amine selected from the group consisting of 10–18 carbon primary n-alkylamines and rosin amines. In particular, such amine-coated calcium carbonates are easily processed and incorporated into rubber stocks and impart high modulus values thereto. Unfortunately, however, rubber stocks containing such amine-coated calcium carbonates have a tendency to prevulcanize at relatively low processing temperatures, which characteristic is known as "scorchiness" in the rubber art. The "scorchiness" of such amine-coated calcium carbonate containing rubber stocks requires closer and more careful control of processing temperatures than are normally employed in the rubber art. The extra care that is required has limited the acceptance of such amine-coated calcium carbonate pigments.

It is an object of this invention to provide a calcium carbonate pigment having improved processing characteristics and one which is more easily dispersed in natural and synthetic rubbers.

A further object of this invention is to provide a calcium carbonate pigment that will provide improved physical properties in the rubber compositions in which it is incorporated.

Another object of the present invention is to provide a calcium carbonate pigment which will provide optimum tear resistance and tensile strength in natural rubber stocks at approximately the same pigment loading.

Yet another object of the invention is to provide a calcium carbonate pigment which will have optimum reinforcing properties in natural rubber at a pigment loading of approximately 50 parts pigment per 100 parts rubber.

A still further object of the invention is to provide a calcium carbonate pigment that can be employed at high loadings in butyl rubber without the use of special detackifying agents.

Other objects and advantages of this invention will become apparent from the following detailed description thereof.

It has been discovered that a calcium carbonate pigment of excellent quality can be prepared by coating the surface of a finely divided calcium carbonate with both a higher amine selected from the group consisting of 10–18 carbon primary n-alkylamines and rosin amines (hereinafter referred to simply as the "higher amine" for the sake of brevity) and a second coating agent selected from the group consisting of 10–20 carbon fatty acids, rosin acids, lower esters of rosin acids and alkali metal salts of rosin acids. These novel surface-coated calcium carbonate pigments have excellent processing characteristics and are easily incorporated into rubber stocks without the difficulties that are usually associated with such fine particle size calcium carbonate pigments. In addition to the improved processing characteristics, the surface-coated calcium carbonate pigments impart improved physical properties to the rubber stock in which they are incorporated, and their optimum reinforcing properties are found in the range of loadings which are most widely used in the rubber art. A most valuable, as well as completely unexpected, property of the surface-coated calcium carbonate pigments is that they can be incorporated at high loadings in butyl rubber stocks, whereas uncoated calcium carbonate, as well as most other inorganic pigments, cannot be used in excess of approximately 50 part loadings, unless special detackifying agents are employed.

The chemical structure and nature of the 10–18 carbon atom primary n-alkylamines are well known and need not be set forth in detail. Such amines are normally derived from fatty alcohols by reaction with ammonia. Although all of the 10–18 carbon atom primary n-alkylamines give excellent results, the 16–18 carbon atom amines give rise to especially outstanding properties in the coated calcium carbonate and such pigments are a preferred embodiment of the invention. The rosin amines, as their name implies, are derived from wood and gum rosins. Chemically the rosins are 20 carbon atom organic acids, principally of the abietic and pimaric acid type. The rosin amines are prepared by first converting the rosin acid to its nitrile (by reaction with ammonia) and hydrogenating the rosin nitrile to form the corresponding amine. A thorough description of the many possible sources of rosin amines and methods of preparing same is contained in U. S. Patent 2,491,913, and that description is incorporated herein by reference. Any such rosin amine is operable in the present invention.

The 10–20 carbon atom fatty acids are well known and such acids as linoleic, myristic, oleic and stearic are operable in the present invention. The rosin acids that are operable include those of the abietic-type and the pimaric-type. For a description of typical operable rosin acids see TAPPI Monograph Series No. 6, P169–173, published in 1948 by the Technical Association of the Pulp and Paper Industry, 122 East 42nd Street, New York, New York. The term "lower esters of rosin acids" includes the esters of 4 carbon and lower alcohols such as the methyl, ethyl, isopropyl, butyl, ethylene glycol and diethylene glycol esters.

The quantity of treating agent that is incorporated on the surface of the calcium carbonate pigment lies within the range of approximately 1–5%, although smaller or larger quantities may be employed if desired. While quantities of treating agent of less than 1.0% may be employed, the maximum improvements in properties are not obtained. Similarly, quantities of treating agent in excess of 5% may be employed and may further improve the processing characteristics of the pigment, but such improved processability is associated with a concomitant decrease in the physical properties of the rubber stock. The optimum combination of properties is usually obtained within the range of 2.0–3.5% treating agent.

In addition to the consideration of the total quantity of treating agent applied to the calcium carbonate, attention must be directed to the molar ratio of the higher amine and secondary treating agent that is employed. The molar ratio of the secondary treating agent to the higher amine should be at least 1/1, since the pigment will be scorchy if the ratio is reduced substantially below this value. This ratio may be as high as 5/1, or even higher, with optimum results usually being obtained at a molar ratio of approximately 3/1. Of course it is obvious that the optimum ratio will depend upon the particular amine and the particular secondary treating agent that are employed, but in general optimum results will be obtained within the above limits.

The novel surface-coated calcium carbonate pigments can be prepared in many different ways. For example, an amine salt of a fatty acid, or other secondary treating agent, may be blended with a calcium carbonate pigment and the resulting mass hammermilled or ball milled. Obviously, the calcium carbonate can be first hammermilled with the higher amine and then the secondary treating agent, or the order can be reversed. Alternatively, a calcium carbonate pigment can be treated with the higher amine in an aqueous slurry, as disclosed in the copending application of Alfred Korejwa et al., Serial No. 363,916, filed June 24, 1953, now U. S. Patent No. 2,709,160, and the resulting amine-treated calcium carbonate then hammermilled with the secondary treating agent. However, since the improved properties of the surface-coated pigments are largely dependent, at least in theory, upon obtaining a uniform coating on the pigment, it is preferred to surface-coat the calcium carbonate in an aqueous slurry that contains an emulsion of both the higher n-primary alkylamine and the secondary treating agent.

The following examples are set forth to more clearly illustrate the principle and practice of this invention to those skilled in the art.

EXAMPLE 1

This example illustrates the method of preparing a higher amine-stearic acid coated calcium carbonate pigment by first preparing a higher amine-coated calcium carbonate in aqueous solution in accordance with the method disclosed in the copending application of Alfred Korejwa et al., Serial No. 363,916, filed June 24, 1953, now U. S. Patent, No. 2,709,160, and subsequently incorporating the stearic acid on the calcium carbonate by hammermilling.

The amine-coated calcium carbonate was prepared by reacting by-product liquor from a commercial ammonia-soda process plant and consisting of approximately 110–120 g. p. l. of $CaCl_2$ solution (distiller blow-off liquor from the ammonia-soda process) with a solution of approximately 160–190 g. p. l. concentration of $Na_2CO_3$ and 50–70 g. p. l. concentration of $NaHCO_3$ (decomposer outlet liquor from the ammonia-soda process). As a factor in controlling the particle size of the precipitated calcium carbonate, caustic soda was added to the distiller blow-off liquor in sufficient quantity to neutralize 80% of the $NaHCO_3$ content. An alkylamine, whose alkyl group contained 16–18 carbon atoms and was derived from tallow, i. e. a mixture of n-primary alkylamines commercially available under the trade name "Armeen–T" manufactured by Armour and Company, Chicago, Illinois, in the form of a hydrochloric acid salt, was added to the calcium chloride solution or distiller blow-off liquor, in an amount of 0.5 percent by weight on the basis of equivalent $CaCO_3$ precipitate derivable therefrom. Stearic acid in an amount corresponding to 1.25% of the calcium carbonate, was then incorporated in the dried amine-treated calcium carbonate and was thoroughly incorporated thereon by hammermilling. The resultant product contained 1.75% treating agent.

EXAMPLE 2

This example illustrates the method of preparing a higher amine-stearic acid coated calcium carbonate by first preparing an amine-coated calcium carbonate in accordance with the method of the copending application of Alfred Korejwa et al., Serial No. 363,916, filed June 24, 1953, now U. S. Patent No. 2,709,160, and treating the resulting product, while still in aqueous suspension, with stearic acid. An amine-coated calcium carbonate, the amine described in Example 1, was prepared as described in Example 1, with the single exception that the amine content was increased to 0.75%. Stearic acid, 1% based upon the dry weight of the calcium carbonate precipitate, was dissolved in acetone and added with stirring to an aqueous slurry of the amine-coated calcium carbonate. The resultant product contained 1.75% treating agent.

EXAMPLE 3

This example illustrates the method of preparing a surface-coated calcium carbonate pigment by treating an aqueous slurry of the pigment with an emulsion containing both a higher amine and stearic acid.

Sixteen grams of a 16–18 carbon primary n-alkylamine, the amine described in Example 1, and 48 grams of stearic acid were melted together and added to 1200 ml. of boiling water containing 18.7 grams of triethanol amine as an emulsifying agent. This emulsion was then added with stirring to an aqueous slurry containing 3300 grams of calcium carbonate at a temperature of 140° F. The resultant product contained 2% treating agent.

EXAMPLE 4

In this example an aqueous slurry of calcium carbonate was treated first with an emulsion of a higher amine and then with an emulsion of stearic acid.

Sixteen grams, as a 10% aqueous emulsion, of the amine described in Example 1 was added with stirring to an aqueous slurry containing 3300 grams of calcium carbonate at temperature of 120° F. This slurry was filtered, washed free of chloride ions and reslurried. An emulsion of stearic acid which contained 48.5 grams of stearic acid was then added to the slurry with stirring at a temperature of approximately 140° F. The slurry was then filtered and dried. The product contained 2% treating agent.

EXAMPLE 5

Example 3 was repeated except that lauric acid was used in lieu of stearic acid.

EXAMPLE 6

Example 3 was repeated except that decylamine was used in lieu of the 16–18 carbon primary n-alkylamine.

EXAMPLE 7

Example 3 was repeated except that dodecylamine was used in lieu of the 16–18 carbon primary n-alkylamine.

EXAMPLE 8

Example 3 was repeated except that dehydroabietylamine was used in lieu of the 16–18 carbon primary n-alkylamine.

EXAMPLE 9

A calcium carbonate pigment was surfaced coated with one part dehydroabietylamine and three parts lauric acid following the procedure described in Example 3.

EXAMPLE 10

The processing characteristics of the surface-coated product of Example 1 were compared with the characteristics of an uncoated calcium carbonate of the same particle size by incorporating 200 parts of each pigment in 100 parts of natural rubber on a two roll differential-speed rubber mill. Whereas the uncoated calcium carbonate formed a hard cake on the back roll, which cake had to be removed by scraping, the surface-coated product showed only a slight tendency to cake and it was not necessary to scrape the back roll. Visual examination of the stock containing uncoated calcium carbonate revealed the presence of poorly dispersed pigment agglomerates, whereas the surface-coated product was well-dispersed and showed no such agglomerates.

The above-described master batches were employed in preparing the following rubber composition:

| Component: | Parts |
|---|---|
| Smoked sheet | 100 |
| Zinc oxide | 5 |
| 2,2′ benzothiazyl disulfide ("Altax") | 1 |
| Sulfur | 3 |
| Stearic acid | 1 5 |
| CaCO₃ pigment | 100 |

¹ Only 3.75 parts used with surface treated pigment.

After press curing at 260° F., the following physical properties were obtained:

Table I

| Physical Property | Time of Cure, Minutes, 260° F. | Uncoated CaCO₃ Control | Surface-Coated CaCO₃ |
|---|---|---|---|
| Tensile | 15 | 2,570 | 2,860 |
|  | 20 | 2,800 | 2,960 |
|  | 25 | 2,930 | 2,950 |
|  | 30 | 2,770 | 2,830 |
| 300% | 15 | 250 | 400 |
|  | 20 | 375 | 600 |
|  | 25 | 450 | 600 |
|  | 30 | 400 | 675 |
| 500% | 15 | 925 | 1,400 |
|  | 20 | 1,225 | 1,750 |
|  | 25 | 1,475 | 1,800 |
|  | 30 | 1,300 | 2,000 |

As seen from the above table, the stocks containing the surface-coated calcium carbonate had superior modulus and tensile values, as compared with the stock containing the uncoated calcium carbonate. Thus, surface-coating of the calcium carbonate not only improved the processing characteristics of the pigment, but improved its rubber reinforcing properties as well.

Similarly, the same surface-coated calcium carbonate was found to have superior processing characteristics in GR–S, cold GR–S, neoprene and butyl rubber.

EXAMPLE 11

The surface-coated calcium carbonate of Example 1 and an uncoated calcium carbonate control were incorporated into the following butyl rubber formulation:

| Component: | Parts |
|---|---|
| Butyl rubber | 100 |
| Zinc oxide | 5 |
| Paraffin | 2 |
| Sulfur | 2 |
| 2-mercaptobenzothiazole ("Captax") | 0.5 |
| Tetramethylthiuram disulfide ("Methyl Tuads") | 1.0 |
| CaCO₃ pigment | 7.5 |

After press curing at 307° F., the following tensile values were obtained:

Table II

| Time of Cure, Minutes, 307° F. | Uncoated CaCO₃ Control | Surface-Coated CaCO₃ |
|---|---|---|
| 10 | 2,150 | 2,090 |
| 20 | 2,030 | 2,230 |
| 30 | 1,880 | 1,920 |
| 40 | 1,540 | 1,870 |

The above data indicate that higher tensile values are obtained in butyl rubber stocks with the surface-coated calcium carbonate pigments of this invention. Other physical properties such as elongation, hardness, etc. were substantially the same in both stocks.

A second butyl rubber stock was prepared by increasing the content of the surface-coated calcium carbonate to 115 parts in the above noted recipe. The stock handled well on the mill and could be easily processed on calenders, and other common rubber processing equipment. On the other hand, when the uncoated calcium carbonate loaring was increased to 115 parts, the stock become so sticky that it would not be handled on the mill. Thus, by employing the surface-coated calcium carbonate pigment, it is possible to obtain much higher pigment loadings in butyl rubber stocks than were heretofore possible.

EXAMPLE 12

The surface-coated calcium carbonate pigment of Example 1 and an uncoated calcium carbonate control were incorporated into the following cold GR-S formulation:

| Component: | Parts |
|---|---|
| GR-S (41° F. polymer) | 100 |
| Cumar resin | 20 |
| Zinc oxide | 5 |
| Stearic acid | 1 |
| 2,2' benzothiazyl disulfide ("Altax") | 1.5 |
| Diphenylguanidine | 0.5 |
| Sulfur | 2.5 |
| $CaCO_3$ pigment | 100 |

After press curing at 287° F., the following physical properties were obtained:

*Table III*

| Physical Property | Cure, 287° F., Minutes | Uncoated $CaCO_3$ control | Surface-Coated $CaCO_3$ |
|---|---|---|---|
| Tensile | 20 | 2,400 | 2,570 |
|  | 30 | 2,400 | 2,550 |
|  | 40 | 2,550 | 2,680 |
|  | 50 |  | 2,490 |
| 500% Modulus | 20 | 600 | 675 |
|  | 30 | 600 | 750 |
|  | 40 | 675 | 775 |
|  | 50 |  | 750 |

From a consideration of the above data, it is seen that higher modulus and tensile values are obtained with the surface treated product. Elongation, hardness, tear resistance, etc., were equivalent in the two stocks.

EXAMPLE 13

To illustrate the rubber reinforcing properties of the surface-coated calcium carbonate pigments over a range of pigment loadings, the surface-coated calcium carbonate of Example 3 was incorporated in the amount of 20, 30, 40, 50, 75, 100, 150 and 200 parts into the following rubber stock:

| Component: | Parts |
|---|---|
| Smoked sheet | 100 |
| Zinc oxide | 5 |
| Stearic acid | 2 |
| 2,2' benzothiazyl disulfide ("Altax") | 1 |
| Sulfur | 2.5 |
| $CaCO_3$ pigment | Variable |

After press curing at 287° F., the following properties were obtained:

*Table IV*

TENSILE STRENGTH, P. S. I.

| Pigment Loading | 20 | 30 | 40 | 50 | 75 | 100 | 150 | 200 |
|---|---|---|---|---|---|---|---|---|
| Cure Time, Minutes: | | | | | | | | |
| 5 |  |  | 2,730 | 3,440 | 3,320 | 2,980 | 2,340 | 2,130 |
| 10 | 2,240 | 3,270 | 3,500 | 3,560 | 3,240 | 2,930 | 2,560 | 1,980 |
| 20 | 2,870 | 3,380 | 3,510 | 3,420 | 3,220 | 2,890 | 2,230 | 1,950 |
| 30 | 3,270 | 3,360 | 3,580 | 3,360 | 3,120 | 2,840 | 2,090 | 2,000 |
| 40 | 2,980 | 3,070 |  |  |  |  |  |  |

HEAT RESISTANCE, P. I.

| Pigment Loading | 20 | 30 | 40 | 50 | 75 | 100 | 150 | 100 |
|---|---|---|---|---|---|---|---|---|
| Cure Time, Minutes: | | | | | | | | |
| 5 |  |  | 313 | 503 | 570 | 530 | 430 | 430 |
| 10 | 223 | 270 | 385 | 480 | 513 | 473 | 405 | 413 |
| 20 | 275 | 285 | 365 | 345 | 400 | 415 | 420 | 420 |
| 30 | 270 | 298 | 330 | 450 | 508 | 415 | 400 | 433 |
| 40 | 240 | 215 |  |  |  |  |  |  |

Referring to the above tensile strength data, it will be noted that optimum reinforcing properties are obtained in the range of approximately 40-60 parts loading. Similarly, optimum tear resistance properties are obtained at approximately the same range of pigment loading, viz. 50-75 parts. These properties are to be distinguished from uncoated calcium carbonate pigments where optimum tensile properties are obtained at approximately 25 parts loading and optimum tear resistance values are obtained only at greater than 100 part loadings.

These results are significant for two reasons: (1) it is possible to obtain both optimum tear and tensile values in a single rubber stock with the surface-coated calcium carbonate, whereas this result cannot be obtained with the uncoated pigment, and (2) optimum values are obtained at approximately 50 parts loading, which loading is used extensively in the rubber industry.

EXAMPLE 14

To illustrate the effect of coating agent content and the molar ratio of the second treating agent to the higher amine on the surface-coated calcium carbonate pigments, several calcium carbonate pigments were surface-coated by the technique of Example 3 with aqueous emulsions containing the higher amine described in Example 1 and stearic acid. Both the total quantity of surface treating agent applied and the molar ratio of the higher amine to stearic acid were varied. The surface-coated calcium carbonate pigments were then compounded into the following GR-S formulation:

| Component: | Parts |
|---|---|
| GR-S | 100 |
| Zinc oxide | 5 |
| Sulfur | 2.5 |
| Cumar resin | 20 |
| n-Cyclohexylbenthiazyl Sulfonamide ("Santocure") | 1.5 |
| Tetramethylthuiram disulfide ("Methyl Tuads") | 0.5 |
| Stearic acid | 1.0 |
| $CaCO_3$ pigment | 150 |

The ratios of the surface treating agents and the physical properties of the vulcanizates are set forth in Table V below:

*Table V*

| Run No. | Surface-Coating | | Mol Ratio of Acid to Amine | Rubber Physicals | | | |
|---|---|---|---|---|---|---|---|
|  | Percent Amine | Percent Stearic Acid |  | 300% Modulus | 500% Modulus | Tensile | Tear |
| 1 | (1) | (1) | (1) | 250 | 1,075 | 1,500 | 150 |
| 2 | 0.25 | 1.75 | 7/1 | 275 | 1,375 | 1,710 | 180 |
| 3 | 0.50 | 1.50 | 3/1 | 350 | 1,375 | 1,740 | 170 |
| 4 | 0.75 | 2.25 | 3/1 | 350 | 1,475 | 1,680 | 145 |
| 5 | 1.5 | 1.5 | 1/1 | 400 |  | 1,570 | 160 |

[1] Untreated control.

It will be noted from the above data, that each and every surface-coated pigment gave improved modulus and tensile values in the vulcanizate. The effect of the molar ratio of the secondary treating agent to the higher amine is seen in the 300% modulus values. As the stearic acid/higher amine ratio is decreased, i. e. as the proportion of amine is increased, the modulus values increase. The increase in modulus is accompanied by an increase in the scorchiness of the pigment, however, and experience has shown that the best combination of properties is obtained when the molar ratio of the secondary treating agent to the higher amine does not exceed 7/1 and preferably when the ratio is about 3/1.

EXAMPLE 15

To illustrate the variation that can be made in the secondary treating agent, Example 2 was repeated except that the 1% stearic acid was replaced with, respectively, the methyl ester of abietic acid, the diethylene glycol ester of abietic acid, the triethylene glycol ester of abietic acid, the sodium salt of abietic acid and tall oil (a commercial product comprising 70% rosin acids and 30% fatty acids, chiefly oleic and linoleic). Each of the surface-coated pigments was then incorporated into the following natural rubber stocks:

| Component: | Parts |
|---|---|
| Smoked sheet | 100 |
| Zinc oxide | 5 |
| Stearic acid | 3 |
| Sulfur | 3 |
| 2,2' benzothiazyl disulfide ("Altax") | 1 |
| CaCO$_3$ pigment | 100 |

Each of the pigments had greatly improved processing characteristics, and when press cured at 260° F. had the following physical properties:

*Table VI*

| Secondary Treating Agent | Rubber Physicals | | |
|---|---|---|---|
| | 300% Modulus | 500% Modulus | Tensile |
| Untreated Control | 325 | 1,150 | 3,010 |
| Methyl ester of Abietic Acid | 625 | 1,800 | 2,940 |
| Diethylene glycol ester of Abietic Acid | 600 | 1,625 | 2,920 |
| Triethylene ester of Abietic Acid | 550 | 1,625 | 2,890 |
| Sodium Salt Abietic Acid | 575 | 1,675 | 2,870 |
| Tall Oil [1] | 525 | 1,575 | 2,940 |

[1] Commercial Mixture—70% rosin acids, 30% fatty acids, chiefly oleic and linoleic.

As noted from the above table, each of the treated pigments had superior modulus values and comparable tensile values.

A similar group of coated pigments was prepared by reacting calcium chloride and sodium carbonate in an aqueous solution in which both the higher amine and the secondary treating agent were emulsified. The same proportions of treating agents were employed and the calcium carbonate precipitate was coated in situ as it was prepared from the reacting solutions. In this case, even superior properties were obtained, probably because of a more homogeneous coating of the calcium carbonate particles.

EXAMPLE 16

The surface-coated calcium carbonate pigment of Example 5 and an untreated control were incorporated into the following natural rubber stock:

| Component: | Parts |
|---|---|
| Smoked sheet | 100 |
| Zinc oxide | 5 |
| Stearic acid | 3 |
| Sulfur | 3 |
| 2,2' benzothiazyl disulfide ("Altax") | 1 |
| CaCO$_3$ pigment | 100 |

The surface-coated pigment had notably superior processing characteristics. When the two stocks were press cured at 260° F., the following physical characteristics were obtained:

*Table VII*

| Physical Property | Uncoated CaCO$_3$ Contro. | Surface-Coated CaCO$_3$ |
|---|---|---|
| 300% Modulus | 325 | 400 |
| 500% Modulus | 1,150 | 1,250 |
| Tensile | 1,620 | 1,850 |

As noted from the above table, the surface-coated pigment had superior modulus and tensile values.

EXAMPLE 17

The surface-coated pigments of Examples 6 and 7, in which the higher amine employed was, respectively, decylamine and dodecylamine and in which the secondary treating agent was stearic acid, were incorporated into the rubber stock shown in Example 14. The following physical properties were obtained:

*Table VIII*

| Surface-Coating | | Rubber Physicals | | | |
|---|---|---|---|---|---|
| Higher Amine | Secondary Coating | 300% Modulus | 500% Modulus | Tensile | Tear |
| Uncoated Control | | 275 | 900 | 1,880 | 200 |
| Decylamine | Stearic Acid | 350 | 1,250 | 1,860 | 250 |
| Dodecylamine | do | 350 | 1,225 | 1,720 | 230 |

The above data demonstrate that the surface-coated pigments have superior modulus and tear values.

EXAMPLE 18

The surface-coated pigment of Example 8, in which the higher amine employed was dehydroabietylamine and in which the secondary treating agent was stearic acid, was incorporated into the natural rubber formulation described in Example 16. The following physical properties were obtained:

*Table IX*

| Pigment | Rubber Physicals | | | |
|---|---|---|---|---|
| | 300% Modulus | 500% Modulus | Tensile | Tear |
| Uncoated Control | 600 | 1,600 | 2,390 | 365 |
| Product Example 8 | 700 | 1,800 | 2,588 | 420 |

The improvement in properties of the coated pigment are apparent from the above data. Comparable results are obtained when the dehydroabietylamine is replaced with abietylamine.

EXAMPLE 19

The surface-coated pigment of Example 9, in which the higher amine employed was dehydroabietylamine and in which the secondary treating agent was lauric acid, was incorporated in the GR–S formulation set forth in Example 14. The surface-coated pigment had superior processing properties, as compared with an uncoated control. The surface coating also improved the rubber reinforcing properties, since a 500% modulus value of 1150 p. s. i. was obtained in the vulcanizate.

While the novel surface-coated calcium carbonate pigments of the present invention have been discussed principally in relation to their utility as a rubber reinforcing pigment, the novel pigments of this invention are valuable for use in paper coating, surface-coating compositions, printing inks, etc. In particular, the surface-coated calcium carbonate pigments of the present invention contain a much smaller proportion of larger agglomerated particles (screen residue) than uncoated calcium carbonates having the same particle size. This fact is illustrated by the example below:

EXAMPLE 20

The proportion of agglomerated particles contained in two of the surface-coated calcium carbonate pigments of Example 13 and an uncoated calcium carbonate control were determined as follows:

Ten gram portions of dry calcium carbonate samples were mixed with 180 ml. of water and 20 ml. of a 1% solution of sodium kerylbenzenesulfonate wetting agent. This mixture was stirred for five minutes and then washed through a 3–5 mesh screen for 8 minutes with tap water. The amount remaining on the screen was dried and weighed. The percentage of residual solid product remaining on the screen, on the basis of the oirginal 10 gram amount, thereby indicated the proportion of the relatively large size agglomerated particles in the original product. The results of this residue test are set forth below:

Table X

| Surface Coating | | Percent 325 Mesh Residue |
|---|---|---|
| Percent Amine | Percent Stearic Acid | |
| Uncoated Control | | 18.7 |
| 0.75 | 2.25 | 2.7 |
| 0.25 | 1.75 | 1.4 |

The foregoing results, indicating an extremely low percentage of relatively large size agglomerated particles in the surface-coated calcium carbonate of the present invention, render such product especially advantageous as a paint and printing ink pigment where the presence of oversized particles is likely to produce the defect known in such arts as "graininess."

Throughout the specification and claims the pigments of the invention are described as having dispersed on their surface both a higher amine and a secondary treating agent. When the secondary treating agent is an acid, obviously a reaction will take place with the amine to form a salt.

What is claimed is:

1. A powdery, rubber reinforcing grade pigment consisting of calcium carbonate with a solid coating dispersed on the surfaces of the particles thereof, said coating consisting of (1) a higher amine selected from the group consisting of primary n-alkyl amines whose alkyl groups contain 10–18 carbon atoms and rosin amines and (2) a compound containing a high molecular weight organic acid radical and selected from the group consisting of 10–20 carbon atom fatty acids, rosin acids, lower esters of rosin acids and metallic salts of rosin acids, the molar ratio of said compound to said higher amine being in a range of 1/1 to 7/1, and the concentration of said coating being sufficient to materially improve the rubber processing and rubber reinforcing properties of said calcium carbonate.

2. A powdery, rubber reinforcing grade pigment consisting of calcium carbonate with a solid coating dispersed on the surfaces of the particles thereof, said coating consisting of (1) a higher amine selected from the group consisting of primary n-alkyl amines whose alkyl groups contain 10–18 carbon atoms and rosin amines, and (2) a compound containing a high molecular weight organic acid radical and selected from the group consisting of 10–20 carbon atom fatty acids, rosin acids, lower esters of rosin acids and metallic salts of rosin acids, the molar ratio of said compound to said higher amine being in the range of 1/1 to 7/1 and the concentration of said coating being about 1–5% by weight of said pigment.

3. A pigment according to claim 2 wherein the molar ratio of said compound to said higher amine is about 3/1.

4. A pigment according to claim 2 wherein said higher amine is a primary n-alkyl amine wherein the alkyl group contains 16–18 carbon atoms and said compound is a 10–20 carbon atom fatty acid.

5. A pigment according to claim 4 wherein said fatty acid is stearic acid.

6. A pigment according to claim 5 wherein the molar ratio of said stearic acid to said primary n-alkyl amine is about 3/1.

7. A pigment according to claim 4 wherein said fatty acid is lauric acid.

8. A pigment according to claim 2 wherein said higher amine is dehydroabietylamine.

9. A pigment according to claim 8 wherein said compound is stearic acid.

10. A pigment according to claim 8 wherein said compound is lauric acid.

References Cited in the file of this patent
UNITED STATES PATENTS

| 1,919,715 | Endres | July 25, 1933 |
| 2,192,956 | Sloan et al. | Mar. 12, 1940 |
| 2,282,006 | Sloan | May 5, 1942 |
| 2,430,385 | Bullifant | Nov. 4, 1947 |
| 2,466,027 | Horney et al. | Apr. 5, 1949 |
| 2,709,160 | Koreywa | May 24, 1955 |

OTHER REFERENCES

See pages 408, 409, 10, 20 and 1021 of the "Organic Chemistry," by Fieser and Fieser (2nd ed.). Published by Heath and Co. of Boston, Mass. (1950).

Official Digest, September 1949, pages 606–609.

UNITED STATES PATENT OFFICE

CERTIFICATE OF CORRECTION

Patent No. 2,841,504  July 1, 1958

Lawrence M. Liggett

It is hereby certified that error appears in the printed specification of the above numbered patent requiring correction and that the said Letters Patent should read as corrected below.

Column 5, line 4, for "contaiing" read -- containing --; line 17, after "at" insert -- a --; column 6, line 67, for "loaring" read -- loading --; column 7, line 61, Table IV, in the heading, for "HEAT" read -- TEAR --; same table, line 63, last column thereof, for "100" read -- 200 --; column 9, line 63, Table VII, second column thereof, in the heading, for "Contro." read -- Control --; column 10, line 57, for "screen" read -- screened --; line 73, for "oirginal" read -- original --

Signed and sealed this 7th day of October 1958.

(SEAL)
Attest:

KARL H. AXLINE
Attesting Officer

ROBERT C. WATSON
Commissioner of Patents